(12) United States Patent
Annee et al.

(10) Patent No.: US 9,261,268 B2
(45) Date of Patent: Feb. 16, 2016

(54) MECHANICAL CONNECTOR FOR LIGHTING APPLICATIONS AND A METHOD FOR USING THE SAME

(71) Applicants: Robert A. Annee, Fishers, IN (US); Steven D. Cole, Indianapolis, IN (US)

(72) Inventors: Robert A. Annee, Fishers, IN (US); Steven D. Cole, Indianapolis, IN (US)

(73) Assignees: Robert A. Annee, Indianapolis, IN (US); Steven D. Cole, Indianapolis, IN (US)

( * ) Notice: Subject to any disclaimer, the term of this patent is extended or adjusted under 35 U.S.C. 154(b) by 292 days.

(21) Appl. No.: 13/787,100

(22) Filed: Mar. 6, 2013

(65) Prior Publication Data

US 2014/0254137 A1 Sep. 11, 2014

(51) Int. Cl.
*F21V 23/06* (2006.01)
*F21V 15/015* (2006.01)
*F21Y 103/00* (2006.01)

(52) U.S. Cl.
CPC ............... *F21V 23/06* (2013.01); *F21V 15/015* (2013.01); *F21Y 2103/00* (2013.01); *Y10T 29/49117* (2015.01); *Y10T 403/11* (2015.01)

(58) Field of Classification Search
CPC ... F21V 19/0005; F21V 23/06; F21V 15/015; F21K 9/10; Y10T 403/11
USPC ........... 313/318.02, 318.06, 318.12; 362/378, 362/581
See application file for complete search history.

(56) References Cited

U.S. PATENT DOCUMENTS

| | | | | |
|---|---|---|---|---|
| 5,565,728 | A | * | 10/1996 | Jung ............................... 313/51 |
| 8,193,690 | B2 | * | 6/2012 | Wursching et al. ......... 313/318.1 |
| 2009/0027916 | A1 | * | 1/2009 | Huang et al. .................. 362/581 |

* cited by examiner

*Primary Examiner* — Karabi Guharay
(74) *Attorney, Agent, or Firm* — Ice Miller LLP

(57) ABSTRACT

A mechanical connector is provided for lighting applications. The mechanical connector, having a modifiable length, includes a connector body portion having an anterior side and a posterior side. A cavity is disposed in the posterior side and sized to receive a lighting apparatus. More than two pins are affixed to the anterior side and extend outward therefrom. Pairs of the more than two pins have a predetermined spacing. Each of the more than two pins is removable from the connector body portion.

23 Claims, 2 Drawing Sheets

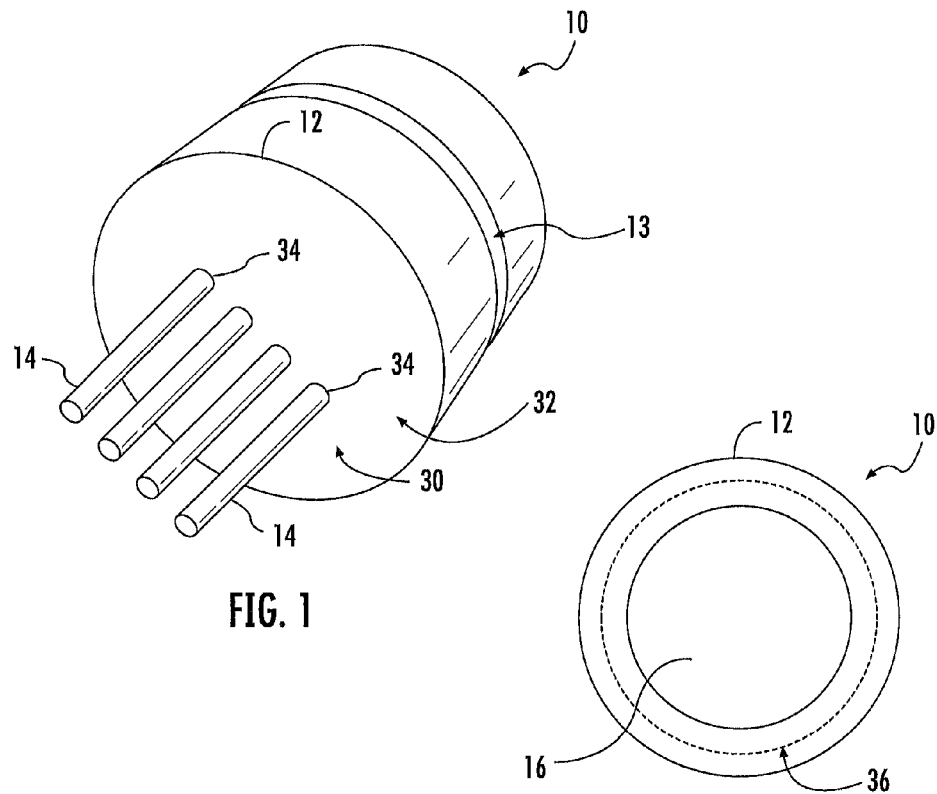
FIG. 1
FIG. 2
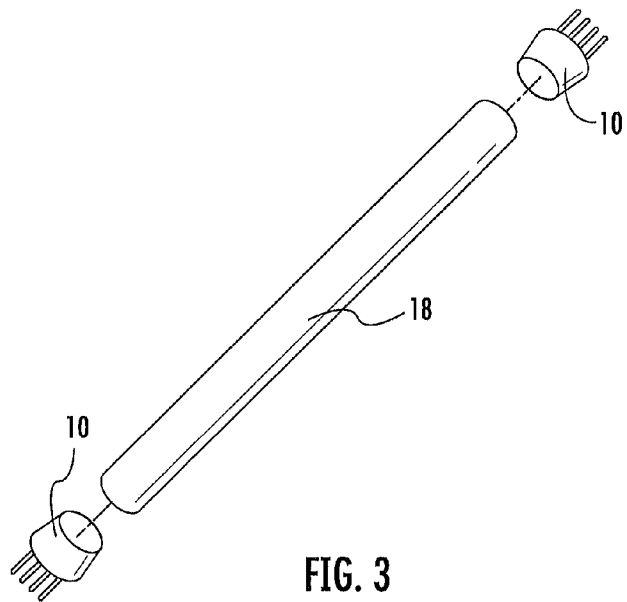
FIG. 3

MECHANICAL CONNECTOR FOR LIGHTING APPLICATIONS AND A METHOD FOR USING THE SAME

TECHNICAL FIELD OF THE DISCLOSURE

The presently disclosed embodiments generally relate to lighting applications and, more particularly, to a mechanical connector for lighting applications and a method for using the same.

Currently, fluorescent and incandescent lamps are being replaced with newer technology lamps such as those using LED (light emitting diode) lighting elements. Such lamps offer advantages of increased energy efficiency, lower heat generation and longer lamp life as compared to older technology.

Traditionally, the electrical connector of a lamp has been used to not only provide electrical power to the lamp, but also to mechanically hold the lamp in position by mating with a socket in the light fixture. Newer lighting technologies like LED lamps may not need the electrical connections within a traditional fixture connector. In the case of fluorescent tube light replacement, the existing lamp end cap connections, which were used to both mechanically hold the fluorescent lamp in place and to provide power to the lamp, are only used to mechanically hold the LED replacement lamp in place in some applications. In these applications, power may or may not be supplied to the LED replacement lamp through the end caps. Prior art fluorescent tube lamp models use different pin configurations on different styles of end caps, requiring different fluorescent tube lamp models to be used in different applications in order for the lamp to mate with a fixture socket.

SUMMARY OF THE DISCLOSED EMBODIMENTS

In an exemplary embodiment of a mechanical connector for lighting applications of the present disclosure, the mechanical connector includes a connector body portion having a groove element thereon to allow removal of a segment therefrom to accommodate varying lengths of a lighting apparatus. The connector body portion includes an anterior and posterior side, wherein a plurality of pins are affixed to the anterior side of the connector body portion, and a cavity is disposed in the posterior side of the connector body portion. More than two pins, affixed to the anterior side of the connector body portion, allow the mechanical connector to fit multiple lighting fixture sockets designs by removing one or more of the pins that are not accommodated by the lighting fixture socket. The cavity, disposed in the posterior side of the connector body portion, is configured to firmly engage the proximal and distal ends of a lighting apparatus to be installed into a lighting fixture socket.

In some embodiments, the pins and a section of the body portion are frangible, such that they may be broken off by the user prior to installing a lighting apparatus into a lighting fixture socket. In other embodiments, the pins and a section of the body portion may be cut from the connector body portion, such as by use of wire cutters or other appropriate tools, prior to mating the mechanical connector with a lighting fixture socket. In some embodiments, the connector body portion and the pins may be composed of a non-conductive material. In other embodiments, the connector body portion and the pins may be composed of a conductive material.

BRIEF DESCRIPTION OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein:

FIG. 1 shows an anterior view of an embodiment of a mechanical connector for lighting applications;

FIG. 2 shows a posterior view of an embodiment of a mechanical connector for lighting applications;

FIG. 3 shows a perspective view of an embodiment of a mechanical connector for lighting applications with a tubular lighting apparatus.

DETAILED DESCRIPTION OF THE DRAWINGS

Figure 4:
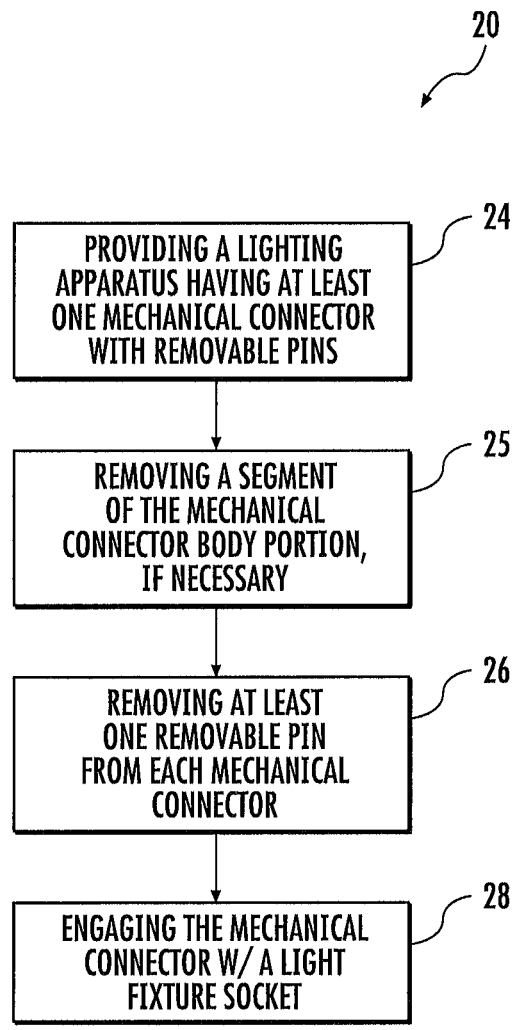
FIG. 4 shows a method for installing a lighting apparatus using a mechanical connector for lighting applications.

For the purposes of promoting an understanding of the principles of the present disclosure, reference will now be made to the embodiments illustrated in the drawing, and specific language will be used to describe the same. It should be appreciated that not all of the features of the components of the figure are necessarily described. Some of these non-discussed features, as well as discussed features are inherent from the figures. Other non-discussed features may be inherent in component geometry and/or configuration. It will nevertheless be understood that no limitation of the scope of this disclosure is thereby intended.

FIG. 1 shows an anterior view of an embodiment of a mechanical connector 10 for lighting applications. The mechanical connector 10 comprises a connector body portion 12 having a groove element 13 thereon to allow removal of a segment therefrom to accommodate varying lengths of a lighting apparatus 18 (see FIG. 3). The connector body portion 12 includes more than two pins 14 affixed to a surface 30 of the anterior side 32 of the connector body portion 12 and extending outward therefrom. In particular, the pins 14 in the exemplary embodiment extend substantially perpendicular to a surface 30 of the anterior side 32. Alternatively, the pins 14 may extend at any suitable angle that corresponds with a lighting fixture socket. The pins 14 are removable to allow the mechanical connector 10 to mate with multiple fixture sockets designs (not shown) by removing one or more of the pins 14 that are not accommodated by a lighting fixture socket (not shown) to which a lighting apparatus 18 (see FIG. 3), for example a lamp or a tube shaped lamp, is to be installed.

The pins 14 are spaced to accommodate multiple fixture socket designs, such as sockets using T5, T8 or T12 bulbs (to name a few non-limiting examples), wherein the pins in the T5 configuration are spaced approximately 5 mm on center and the pins in the T8 and T12 configuration are spaced approximately 12.7 mm on center. In the illustrated embodiment, the mechanical connector 10 includes four pins 14. The outermost pins 14 have a predetermined spacing to complement a fixture socket designed for T8 and T12 bulbs and the innermost pins 14 have a predetermined spacing to complement a fixture socket design for T5 bulbs. Accordingly, by removing the outermost pins 14, the remaining innermost pins 14 become compatible with the fixture socket designed for T5 bulbs. Likewise, by removing the innermost pins 14, the remaining outermost pins 14 become compatible with a fixture socket designed for T12 bulbs.

In some embodiments, the connector body portion 12 is frangible, such that a segment may be broken off along groove element 13 by a user prior to installing the mechanical connector 10 into a lighting fixture socket. In other embodiments, a segment may be cut from the connector body portion 12 along groove element 13, such as by use of wire cutters or other appropriate tools, prior to installing the mechanical connector 10 into a lighting fixture socket.

In some embodiments, the pins 14 are frangible, such that they may be broken off of the connector body portion 12 by a user prior to installing the mechanical connector 10 into a lighting fixture socket. In other embodiments, the pins 14 may be cut from the connector body portion 12, such as by use of wire cutters or other appropriate tools, prior to installing the mechanical connector 10 into a lighting fixture socket. In an exemplary embodiment, the pins 14 are removable, i.e. frangible or capable of being cut, at a base 34 of the pin 14, wherein the base 34 of the pin 14 is positioned adjacent to the surface 30 of the anterior side 32.

FIG. 2 shows a posterior view of an embodiment of a mechanical connector 10 for lighting applications. The posterior side 36 of the connector body portion 12 is connectable to the lighting apparatus 18. In the illustrated embodiment, the connector body portion 12 includes a cavity 16 disposed in the posterior side that is sized by diameter and depth, and configured to engage the lighting apparatus 18.

In one embodiment, connector body portion 12 and the pins 14 may be composed of a non-conductive material such as plastic, to name one non-limiting example. In such an embodiment, the pins 14 are strictly utilized to retain the lighting apparatus 18 in the fixture socket and no electricity is transferred through the pins 14 or the connector body portion. Accordingly, the lighting apparatus 18 may include a separate wire (not shown) to power the lighting apparatus 18 from a device in which the lighting apparatus 18 is positioned or from an outlet or the like. In an alternative embodiment, the connector body portion 12 and/or the pins 14 may be conductive, but are not used to power the lighting apparatus 18. In another embodiment, the connector body portion 12 and/or the pins 14 may be composed of a conductive material such as aluminum, to name one non-limiting example. In such an embodiment, the pins 14 and/or the connector body portion 12 are electrically coupled to the lighting apparatus 18 to power the lighting apparatus 18.

FIG. 3 shows a perspective view of an embodiment of a mechanical connector 10 for lighting applications with a lighting apparatus 18. In the exemplary embodiment, the cavity 16 of a mechanical connector 10 engages the proximal or distal end of a tube shaped lighting apparatus 18 until firmly seated therein. Once the tube shaped lighting apparatus 18 and mechanical connector 10 are properly engaged, the combination therewith may be installed into a lighting fixture socket after removal of at least one of the more than two pins 14 as described herein. In other embodiments, prior to engaging the mechanical connector 10 with the proximal or distal end of a lighting apparatus 18, a segment of each of the mechanical connectors 10 may be removed along the groove element 13 to accommodate a second length of the lighting apparatus 18. In other embodiments, prior to engaging the mechanical connector 10 with the proximal or distal end of a lighting apparatus 18, a segment of only one mechanical connector 10 may be removed along the groove element 13 to accommodate a third length of the lighting apparatus 18. In other embodiments, there may be more than one groove element 13 to accommodate different lengths of a lighting apparatus 18.

In other embodiments, the mechanical connector 10 may not include the cavity 16, but rather, a surface of the posterior side 36 may include modifiable tabs, slots, and/or other mechanisms to attach the mechanical connector 10 to the lighting apparatus 18. In yet another embodiment, the cavity 16 may have tabs, slots, or other mechanisms disposed therein to secure the mechanical connector 10 to the lighting apparatus 18. In a further embodiment, the mechanical connector 10 may be adhered to the lighting apparatus 18 by an adhesive. However, it is important to note that it is not important how the mechanical connector 10 is attached to the lighting apparatus 18.

FIG. 4 shows a method for installing a lighting apparatus using a mechanical connector for lighting applications. As shown in FIG. 4, an exemplary method 20 includes the step 24 includes providing a lighting apparatus 18 having a proximal end engaged with a posterior side of a first mechanical connector 10. In the illustrated embodiments, the lighting apparatus 18 likewise includes a distal end engaged with a posterior side of a second mechanical connector 10. Step 25 also includes removing a segment of the mechanical connector body portion 12 along the groove element 13 to adjust the length, if necessary. Step 26 includes removing at least one of the more than two pins affixed to anterior sides of the first and second mechanical connectors 10 by either breaking the pin or cutting the pin from the anterior side so that the remaining pins have a predetermined spacing that allows the first and second mechanical connectors to mate with a desired lighting fixture socket. Step 28 comprises engaging the first and second mechanical connectors with the desired lighting fixture socket. It should be noted that although the method has been described with respect to attaching a first and second mechanical connector, the embodiments and methods described herein may also apply to a lighting apparatus that utilizes only one mechanical connector.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. A mechanical connector for lighting applications comprising:
   a connector body portion including an anterior side and a posterior side;
   a cavity disposed in the posterior side and sized to receive a lighting apparatus; and
   more than two pins affixed to the anterior side and extending outward therefrom, wherein pairs of the more than two pins have a predetermined spacing, each of the more than two pins being removable from the connector body portion,
   wherein a segment of the connector body portion is adjustable so that the posterior side of the connector body portion is positioned closer to the more than two pins after adjustment.

2. The connector of claim 1, wherein the connector body portion includes a groove element thereon for removal of the segment therefrom.

3. The connector of claim 2, wherein the groove element extends along a perimeter of the connector body portion.

4. The connector of claim 2, wherein the segment is at least one of frangible to be broken off the connector body portion or is cut off the connector body portion.

5. The connector of claim 1, wherein each of the more than two pins is at least one of frangible to be broken off the connector body portion or is cut off the connector body portion.

6. The connector of claim 5, wherein each of the more than two pins is frangible at a base of the pin adjacent the connector body portion.

7. The connector of claim 1, wherein the predetermined spacing complies with at least one of T5 or T8 or T12 pin spacing.

8. The connector of claim 1, wherein the connector body portion is composed of a non-conductive material.

9. The connector of claim 1, wherein the more than two pins are composed of a non-conductive material.

10. The connector of claim 1, wherein at least one of the connector body portion or the more than two pins is composed of a conductive material.

11. A lighting apparatus for use with a lighting fixture socket comprising:
 a lamp having distal and proximal ends;
 mechanical connectors provided on each of the distal and proximal ends, wherein each mechanical connector includes a connector body portion having an anterior side and a posterior side, wherein the posterior side is connected to an end of the lamp; and
 more than two removable pins affixed to the anterior side of each mechanical connector so that a spacing between at least two of the pins complements a spacing of the lighting fixture socket,
 wherein a segment of the connector body portion is adjustable so that the posterior side of the connector body portion is positioned closer to the more than two removable pins after adjustment.

12. The lighting apparatus of claim 11, wherein the lamp is a tube lamp.

13. The lighting apparatus of claim 11, wherein the mechanical connector is composed of a non-conductive material.

14. The lighting apparatus of claim 11, wherein the more than two pins are composed of a conductive material.

15. The lighting apparatus of claim 11, wherein the mechanical connector is composed of a conductive material.

16. The lighting apparatus of claim 11, wherein pairs of the more than two pins have a predetermined spacing.

17. The lighting apparatus of claim 11, wherein each of the more than two pins is at least one of frangible to be broken off the connector body portion or is cut off the connector body portion.

18. The lighting apparatus of claim 17, wherein each of the more than two pins is frangible at a base of the pin adjacent the connector body portion.

19. The lighting apparatus claim 11, wherein the connector body portion includes a groove element thereon for removal of the segment therefrom.

20. The lighting apparatus of claim 19, wherein the groove element extends along a perimeter of the connector body portion.

21. The lighting apparatus of claim 19, wherein the segment is at least one of frangible to be broken off the connector body portion or is cut off the connector body portion.

22. A method for installing a lighting apparatus in a lighting fixture socket comprising:
 (a) providing a lighting apparatus having a mechanical connector attached to both a proximal end and a distal end thereof, the mechanical connector having a groove element to adjust a length thereon, and more than two removable pins extending therefrom, wherein the length of the mechanical connector is adjustable so that a posterior end of the mechanical connector is positioned closer to the more than two removable pins after adjustment;
 (b) removing at least one of the more than two removable pins from each mechanical connector so that a spacing of remaining pins complements the lighting fixture socket; and
 (c) engaging the remaining pins of each mechanical connector with the lighting fixture socket.

23. The method of claim 22, wherein step (a) further comprises removing a segment of the mechanical connector along the groove element to adjust the length, of the mechanical connector, prior to attaching the mechanical connector to the proximal end and distal end of the lighting apparatus.

\* \* \* \* \*